United States Patent
Tsai et al.

(10) Patent No.: US 7,057,366 B1
(45) Date of Patent: Jun. 6, 2006

(54) METHOD FOR ESTIMATING LOAD INERTIA AND A SYSTEM FOR CONTROLLING MOTOR SPEED USING INVERSE MODEL

(75) Inventors: Ching-Hsiung Tsai, Tainan (TW); Jia-Ming Wu, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 0 days.

(21) Appl. No.: 11/235,274

(22) Filed: Sep. 27, 2005

(30) Foreign Application Priority Data

Aug. 19, 2005 (TW) .............................. 94128528 A

(51) Int. Cl.
  *G05B 13/00* (2006.01)

(52) U.S. Cl. ........................ 318/561; 318/560; 700/29; 700/44; 700/30; 700/45; 700/46; 700/54

(58) Field of Classification Search ............... 318/561, 318/560; 700/29, 44, 45, 46, 54, 37
See application file for complete search history.

(56) References Cited

U.S. PATENT DOCUMENTS

| | | | | |
|---|---|---|---|---|
| 4,679,103 A * | 7/1987 | Workman | ................. | 360/78.07 |
| 4,786,990 A * | 11/1988 | Overton et al. | ................ | 360/65 |
| 5,191,272 A * | 3/1993 | Torii et al. | ................... | 318/609 |
| 5,602,689 A * | 2/1997 | Kadlec et al. | ........... | 360/78.04 |
| 5,638,230 A * | 6/1997 | Kadlec | ..................... | 360/78.04 |
| 5,675,450 A * | 10/1997 | Kadlec | ..................... | 360/78.09 |
| 5,834,918 A * | 11/1998 | Taylor et al. | ................ | 318/601 |
| 6,198,246 B1 * | 3/2001 | Yutkowitz | .................... | 318/561 |
| 6,259,221 B1 * | 7/2001 | Yutkowitz | .................... | 318/561 |
| 6,838,854 B1 * | 1/2005 | Inagaki et al. | .............. | 318/701 |
| 6,900,607 B1 * | 5/2005 | Kleinau et al. | ............. | 318/432 |

* cited by examiner

*Primary Examiner*—Rita Leykin
(74) *Attorney, Agent, or Firm*—Harness, Dickey & Pierce, PLC

(57) ABSTRACT

A method for estimating load inertia and system for controlling motor speed using inverse model are provided, suitable for an alternating current (AC) servo module. An inverse system is connected to an actual system to inversely deduce a substantial torque output, wherein when the value of the speed signal generated by the actual system gradually increases, a net inertia ratio is accumulated; whereas when the value of the speed signal generated by the actual system increases to a fixed value, the net inertia ratio is updated.

8 Claims, 3 Drawing Sheets

METHOD FOR ESTIMATING LOAD INERTIA AND A SYSTEM FOR CONTROLLING MOTOR SPEED USING INVERSE MODEL

BACKGROUND

This Non-provisional application claims priority under 35 U.S.C. § 119(a) on Patent Application No(s). 94128528 filed in Taiwan on Aug. 19, 2005, the entire contents of which are hereby incorporated by reference.

FIELD OF INVENTION

The present invention relates to a technology of estimating load inertia, and more particularly to a method for estimating load inertia and system for controlling motor speed using an inverse model.

RELATED ART

An alternating current (AC) servo module mainly includes two parts, a driver and a motor. The servo motor is mounted on the applied mechanism for achieving positioning and speed control. Thus, the rotor inertia of the load is one of the important parameters in designing an AC servo driver. Only when the parameter is accurately estimated, it can be ensured that the AC servo driver is provided with this parameter of a correct value to conduct accurate controlling operations during its operating process. However, since it is difficult to obtain the inertia value of the mechanism by means of mathematical calculations, real time online estimating means is required, to enable the AC servo driver to know about the factor variation of itself and surroundings in real time.

Referring to FIG. 1, it is a traditional system for controlling motor speed, wherein a first synthesizer 110, a first gain controller 120, a current loop 130, a second gain controller 140, a second synthesizer 150, and a motor mathematical model 160 are sequentially connected in series into a loop. The first synthesizer 110 receives a speed command ω* and a speed signal ω fed back by the motor mathematical model 160, and outputs an error signal; this error signal in turn passes through the first gain controller 120, which outputs a first gain signal. The first gain signal is then converted into a current signal i through the current loop 130, to be input into the second gain controller 140. The second gain controller 140 generates a second gain signal according to said current signal i, then the second synthesizer 150 receives the second gain signal, and synthesizes it with a torque signal $T_l$ into a resulting signal, which is input into the motor mathematical model 160 for controlling the speed thereof. Herein, the current signal i will be output, thereby the actual load inertia may be estimated.

The first gain controller 120 is a proportion/integral controller, with its gain value of:

$$Kp + \frac{Ki}{s}.$$

The gain value of the second gain controller 140 is: Kt. The formula of the motor mathematical model 160 is:

$$\frac{1}{J_l:s+B}.$$

Kp, Ki, and Kt are three constant values;

$$\frac{Ki}{s}$$

represents an integral of Ki; $J_l$ is the load inertia; $J_l$:s represents the differential of the load inertia, and B is the mechanical damping.

With the general design, the bandwidth of the current loop is always much larger than that of the speed loop, thus the influence of the current loop is often omitted. In addition, the load inertia ($J_l$) is much larger than the mechanical damping (B), therefore the value B can also be omitted.

Accordingly, a simplified traditional system for controlling motor speed is obtained, as shown in FIG. 2, wherein the formula of the motor mathematical model 160 is:

$$\frac{1}{J_l:s}.$$

Thereby, the relations of the output speed signal ω, the current signal i, and the torque signal $T_l$ can be derived as below:

$$\omega = \frac{i \times Kt + T_l}{J_l:s} \qquad \text{Equation I}$$

$$\rightarrow \int J_l \frac{d\omega}{dt} = i \times Kt + T_l \qquad \text{Equation II}$$

$$\rightarrow \int J_l d\omega = \int (i \times Kt + T_l) dt$$

$$\rightarrow J_l = \frac{\int (i \times Kt + T_l) dt}{\int d\omega}.$$

Equation II can be derived by simplifying Equation I. And in the sampling system, when the sampling rate is h seconds (sec) and from to $t_0$ $t_1$, the relation of a load inertia can be derived from Equation II as below:

$$J_t = \frac{h \sum (i \times Kt + T_l) dt}{\omega_1 - \omega_0}. \qquad \text{Equation III}$$

From Equation III, it can be appreciated that since its denominator is a variable, the amount of the sampling points has a great influence on the estimated value of the load inertia $J_l$, so that the estimated value of the load inertia $J_l$ significantly varies.

SUMMARY

In view of the above-mentioned problems, the main object of the invention is to provide a method for estimating load inertia and system for controlling motor speed using an inverse model, thereby solving the problems and limits of the prior art.

The method for estimating load inertia and system for controlling motor speed using an inverse model disclosed in the present invention is to inversely deduce a substantial torque output using an inverse model.

The method for estimating load inertia and system for controlling motor speed using an inverse model disclosed in the present invention can achieve the estimation of load inertia with fast convergence and slow steady-state error.

Therefore, in order to achieve the above-mentioned objects, the method for estimating load inertia using an inverse model disclosed in the present invention is suitable for an AC servo module, wherein a load inertia is estimated by receiving a speed command and a torque signal, which comprises the following steps: first, setting a first relation as following in an actual system:

$$\breve{T}_l = Kt \cdot i + T_l = \frac{\omega}{J_l \cdot s};$$

then, setting a second relation as following in an inverse system:

$$i_0 \times Kt = \frac{\omega_0}{J_0 \cdot s};$$

after that, deriving a third relation from the first relation and the second relation, as follows:

$$i_0 \times Kt = (Kt \cdot i + T_l) \times \frac{J_l}{J_0} = \frac{1}{\eta} \breve{T}_l.$$

When the motor of the AC servo module rotates at a uniform rate, the torque signal $T_l$ derived from the third relation is a $Kt \cdot i$; whereas when the motor of the AC servo module rotates at a variable rate, the net torque signal $\breve{T}_l$ derived from the third relation is $T_l + Kt \cdot i$.

$\breve{T}_l$ represents the net torque signal; Kt represents the gain constant; i, $i_0$ represent the current signals generated by the actual system and the inverse system respectively; $T_l$ represents the torque signal; $\omega$, $\omega_0$ represent the speed signals generated by the actual system and the inverse system respectively; $J_l$, $J_0$ represent the load inertia and the unit motor inertia respectively; the current signal i is generated by the actual system according to the speed command and the feedback speed signal; whereas the current signal $i_0$ is generated by the inverse system according to the speed signal $\omega$ from the actual system and the feedback speed signal $\omega_0$, and furthermore, the speed signal $\omega$ substantially equals to the speed signal $\omega_0$.

Additionally, the following steps are further included: deriving a fourth relation from the third relation as follows:

$$\hat{\eta} = \hat{\eta} + \mu \sum_{\omega=\omega 0}^{\omega 1} \left( \breve{T}_l - \hat{\eta} \times Kt \times i_0 \right);$$

wherein, when the value of the speed signal $\omega$ increases from $\omega 0$ to $\omega 1$, the net inertia ratio $\hat{\eta}$ is accumulated according to the fourth relation; whereas when the value of the speed signal $\omega$ reaches $\omega 1$, the net inertia ratio $\hat{\eta}$ is updated according to the fourth relation, wherein, $\eta$ represents an inertia ratio from dividing the load inertia $J_l$ by the unit motor inertia $J_0$, $\hat{\eta}$ represents a net inertia ratio, and the absolute value of the difference between $\omega 1$ and $\omega 0$, and $\mu$ are respectively fixed values.

Herein, the inverse system can be designed into a high bandwidth loop, in which the high bandwidth loop may have a bandwidth of about 300 Hz.

The present invention further discloses a system for controlling motor speed using an inverse model, suitable for an AC servo module, which comprises: an actual system and an inverse system.

In the actual system, a first synthesizer, a first gain controller, a current loop, a second gain controller, a second synthesizer, and a motor mathematical model are included. These six elements are sequentially connected in series into a loop. The first synthesizer is used for receiving an input speed signal and generating an error signal according to the input speed signal and a feedback speed signal; the first gain controller generates a first gain signal according to the error signal; the current loop in turn converts the first gain signal into a corresponding current signal; the second gain controller generates a second gain signal according to the current signal; the second synthesizer synthesizes a torque signal with the second gain signal into a net torque signal; and finally, the motor mathematical model generates a speed signal according to the net torque signal, and feeds the speed signal back into the first synthesizer.

As for the inverse system, a third synthesizer, a third gain controller, a current loop, a fourth gain controller, and a motor mathematical model are included. These five elements are sequentially connected in series into a loop, and the third synthesizer may be connected with the motor mathematical model of the actual system. Wherein, the third synthesizer will generate an error signal according to the speed signal generated by the actual system and the feedback speed signal; the third gain controller generates a third gain signal according to the error signal generated by the third synthesizer; then the current loop converts the third gain signal into a corresponding current signal; the fourth gain controller generates a fourth gain signal according to the current signal; and finally, the motor mathematical model generates a speed signal according to the fourth gain signal, and feeds the speed signal back into the third synthesizer.

The net torque signal is estimated by utilizing an adaptive algorithm according to these current signals generated by the actual system and the inverse system, thereby the load inertia of the AC servo module is estimated.

In addition, the speed signal generated by the actual system substantially equals to the speed signal generated by the inverse system.

Furthermore, the bandwidths of the actual system and the inverse system are much smaller than that of the current loop.

Herein, the first and third gain controllers can be proportion/integral controllers.

The features and the practices of the present invention will be described in great detail through the most preferred embodiments, with reference to the accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
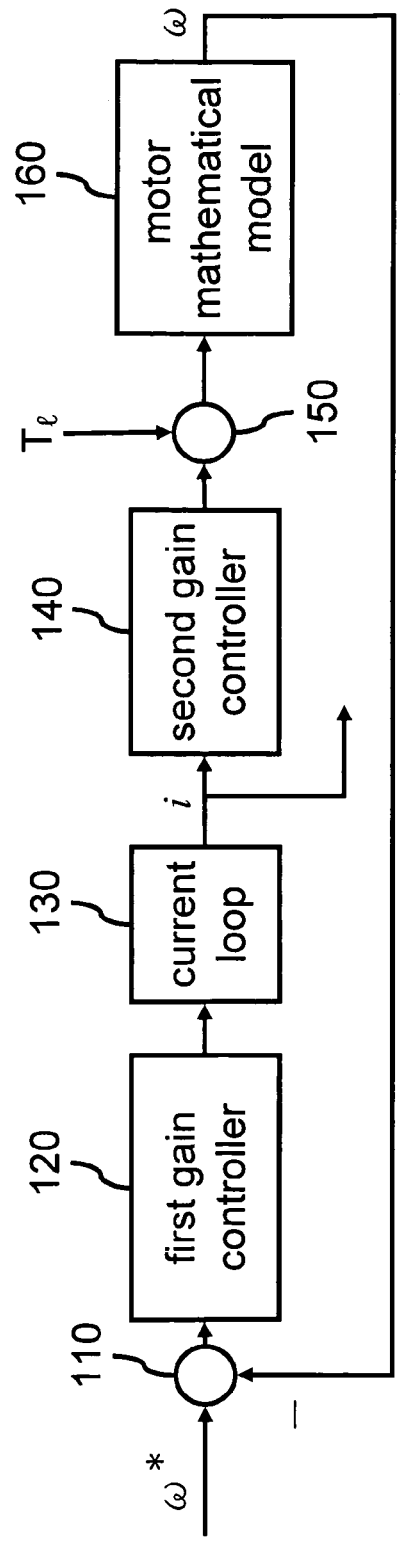
FIG. 1 is a schematic block diagram illustrating a traditional system for controlling motor speed.
Figure 2:
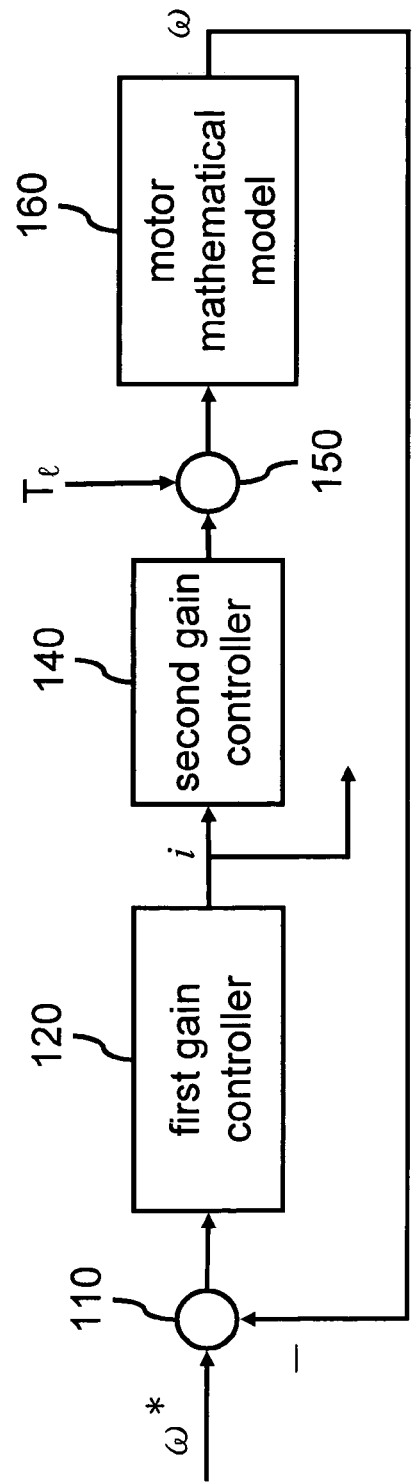
FIG. 2 is a schematic block diagram of the simplified system of FIG. 1.

Specific embodiments are listed below to illustrate the disclosure of the present invention in great detail, with reference to the accompanying drawings. The reference numerals mentioned in the description are those referring to the drawings.

The invention is mainly for inversely deducing a substantial torque output using an inverse system; thereby the actual load inertia is estimated by utilizing an adaptive algorithm, so as to achieve the objects of real time estimating and accurate controlling.

Figure 3:
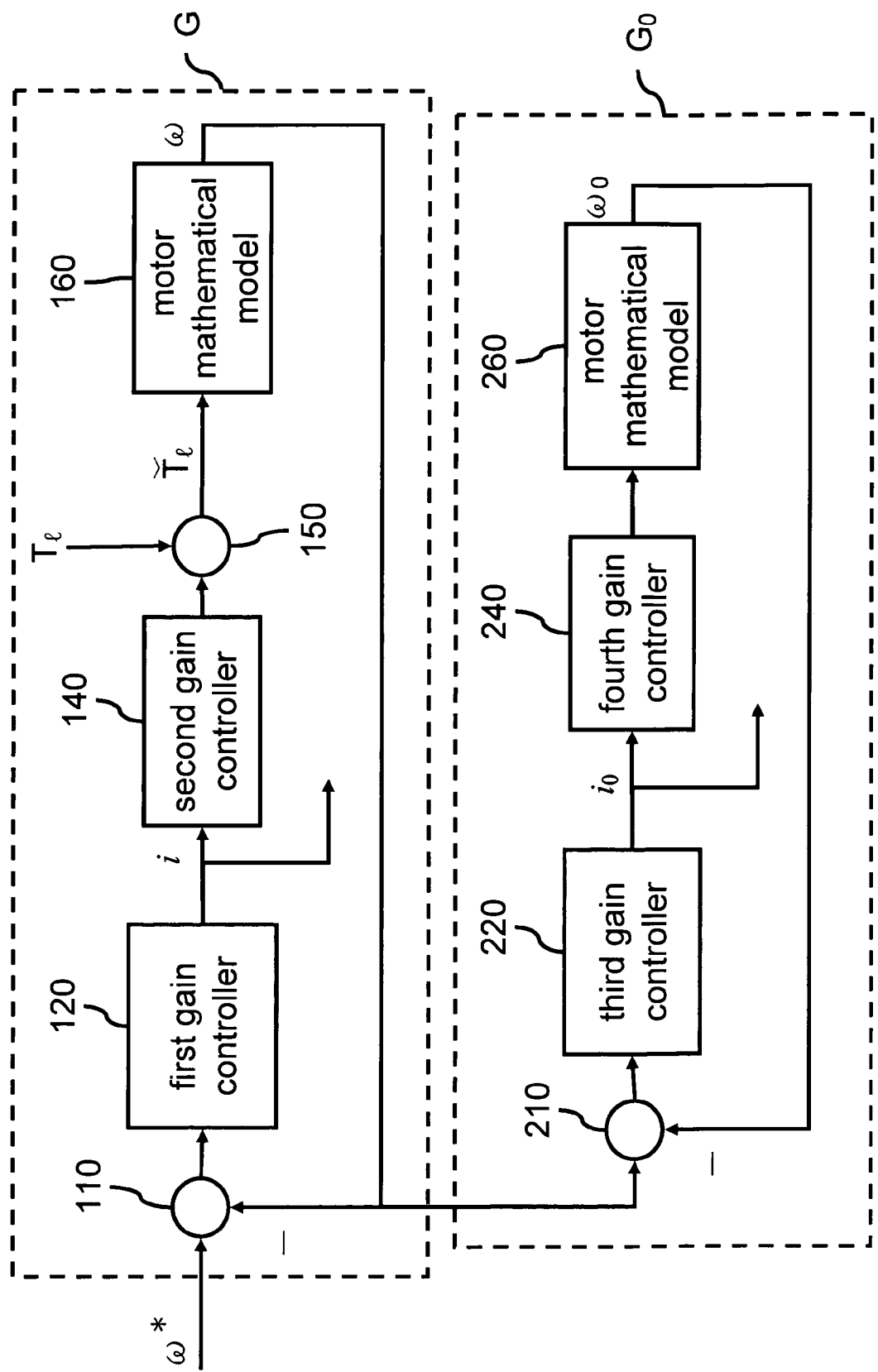
FIG. 3 is a schematic block diagram illustrating a system for controlling motor speed using an inverse model according to an embodiment of the present invention.

Referring to FIG. 3, it is a system for controlling motor speed using an inverse model according to an embodiment of the present invention, which is suitable for an AC servo module, and mainly comprises an actual system G and an inverse system $G_0$.

The configuration of elements and operations of this actual system G are substantially the same as the above-mentioned traditional system for controlling motor speed, therefore it will not be illustrated any more. This actual system G consists of a first synthesizer 110, a first gain controller 120, a current loop (the influence of the current loop also can be omitted herein, thus not shown in the figures), a second gain controller 140, a second synthesizer 150, and a motor mathematical model 160 sequentially connected in series into a loop, wherein, the second synthesizer 150 synthesizes the second gain signal with the torque signal $T_l$ into a net torque signal $\check{T}_l$, and this net torque signal $\check{T}_l$ is input into the motor mathematical model 160 for controlling the speed thereof. And the speed signal ω generated by the motor mathematical model 160 will also be input into the inverse system $G_0$, in addition to being fed back into the first synthesizer 110.

The inverse system $G_0$ consists of a third synthesizer 210, a third gain controller 220, a fourth gain controller 240, a current loop (the influence of the current loop also can be omitted herein, thus not shown in the figures), and a motor mathematical model 260 sequentially connected in series into a loop. The third synthesizer 210 receives a speed signal ω from the actual system G and a speed signal $ω_0$ fed back by the motor mathematical model 260, and outputs an error signal; and the error signal in turn passes through the third gain controller 220, which outputs the third gain signal. The third gain signal is converted into a current signal $i_0$ through the current loop 230 to be input into the fourth gain controller 240. And the fourth gain controller 240 generates a second gain signal according to this current signal $i_0$, which is input into the motor mathematical model 260 for controlling the speed thereof. Herein, the current signal $i_0$ will be output, thereby the actual load inertia can be estimated by utilizing an adaptive algorithm through the current signal i and the current signal $i_0$. Herein, the first and third gain controllers 120, 220 are proportion/integral controllers (P/I controller) respectively.

Herein, this inverse system $G_0$ is designed into a high bandwidth (e.g. 300 Hz) loop, and the speed signal $ω_0$ output by this inverse system is substantially similar to the speed signal ω output by the actual system G, i.e., $ω_0 \approx ω$.

As for the actual system G, the first gain controller 120 is a P/I controller with the gain value of:

$$Kp + \frac{Ki}{s};$$

the gain value of the second gain controller 140 is: Kt; the formula of the motor mathematical model 160 is:

$$\frac{1}{j_l : s + B}.$$

As for the inverse system $G_0$, the third gain controller 220 is also a P/I controller with the gain value of:

$$Kp_0 + \frac{Ki_0}{s};$$

the gain value of the fourth gain controller 240 is also: Kt; the formula of the motor mathematical model 260 is:

$$\frac{1}{J_0 : s + B}.$$

Kp, $Kp_0$, Ki, $Ki_0$, and Kt are all constant values;

$$\frac{Ki}{s} \text{ and } \frac{Ki_0}{s}$$

respectively indicate the integral of Ki and the integral of $Ki_0$; $J_l$ is the load inertia, $J_l$:s indicates the differential of the load inertia; $J_0$ is the unit motor inertia, $J_0$:s indicates the differential of the unit motor inertia; and B is also a mechanical damping, and since the load inertia ($J_l$) and the unit motor inertia ($J_0$) will be much larger than the mechanical damping (B), the value B can be omitted, and correspondingly the formula of the motor mathematical model 160 is:

$$\frac{1}{J_l : s},$$

and the formula of the motor mathematical model 260 is:

$$\frac{1}{J_0 : s}.$$

Therefore, the first and second relations can be derived, as shown by Equation IV and Equation V:

$$\check{T}_l = Kt : i + T_l = \frac{\omega}{J_l : s}, \qquad \text{Equation IV}$$

$$i_0 \times Kt = \frac{\omega_0}{J_0 : s}, \qquad \text{Equation V}$$

wherein, since $\omega_0 \approx \omega$, Equation VI (i.e., the third relation) can be derived from Equation IV and Equation V, as follows:

$$\check{T}_l = (J_l : s) = (Kt : i + T_l) \times (J_l : s) =$$
$$(i_0 \times Kt) \times (J_0 : s) \rightarrow \rightarrow i_0 \times Kt = \qquad \text{Equation VI}$$
$$(Kt : i + T_l) \times \frac{J_l}{J_0} = \check{T}_l \times \frac{J_l}{J_0}.$$

Also, the inertia ratio η is defined as the load inertia divided by the unit motor inertia $$\frac{J_l}{J_0},$$

thus, Equation VI can be simplified into Equation VII (i.e., the third relation), as follows:

$$i_0 \times Kt = (Kt : i + T_l) \times \frac{J_l}{J_0} = \frac{1}{\eta} \check{T}_l, \qquad \text{Equation VII}$$

wherein, when the absolute value of the current signal $i_0$ generated by the inverse system $G_0$ is minimum, it indicates the motor rotates at a uniform rate, so that the net current i is almost zero; thereby, $T_l = -Kt: i$ can be derived. Whereas when the absolute value of the current signal $i_0$ is sufficiently high, i.e., indicating that the motor rotates at a variable rate, that's to say, the net torque signal $\check{T}_l$ has been big enough. And the current signal being output at this time is i, thus, $\check{T}_l = T_l + Kt: i$ can be derived.

Furthermore, Equation VIII (i.e., the fourth relation) can be derived from Equation VII in order to estimate the inertia ratio η, as follows:

$$\hat{\eta} = \hat{\eta} + \mu \sum_{\omega=\omega 0}^{\omega 1} (\check{T}_l - \hat{\eta} \times Kt \times i_0), \qquad \text{Equation VIII}$$

wherein, |ω1−ω0| and μ are fixed values respectively.

Figure 4:
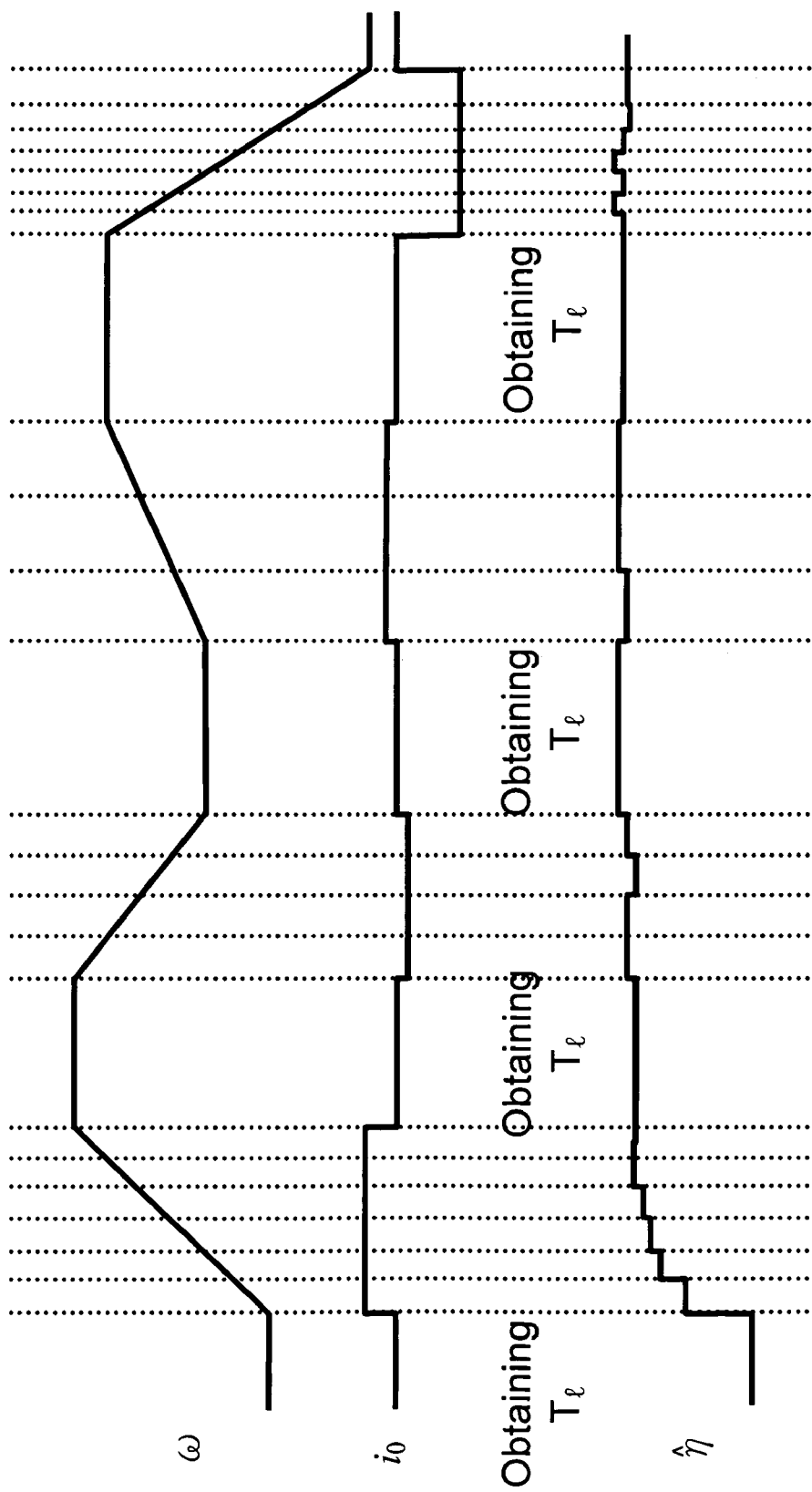
FIG. 4 is a schematic view of each signals generated by the system in FIG. 3.

When the speed ω varies from ω0 to ω1, $\hat{\eta}$ will be updated once, and then the accumulating process resumes, and $\hat{\eta}$ is repeatedly updated, when ω increases to a fixed value, as shown in FIG. 4, wherein, $\hat{\eta}$ represents a net inertia ratio.

In this embodiment, since there are no operations involving the denominator of Equation VIII, in practice, it achieves a lower variability for the steady-state error, as well as a high convergence rate, as compared with the conventional art. Additionally, the current signal $i_0$ obtained thereby can be used for identifying the occasion of a uniform rate or a variable rate, in order to determine whether the estimated value of the torque signal $T_l$ is updated or not. Thus, a more correct torque signal $T_l$ value can be obtained to further estimate the load inertia $j_l$ accurately.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for estimating load inertia using an inverse model, suitable for an alternating current (AC) servo module, which estimates a load inertia by receiving a speed command and a torque signal, comprising the steps of:

setting a first relation as following in an actual system:

$$\check{T}_l = Kt{:}i + T_l = \frac{\omega}{J_l{:}s},$$

wherein, $\check{T}_l$ represents a net torque signal; Kt represents a gain constant; i represents a current signal generated by the actual system; $T_l$ represents the torque signal; ω represents a speed signal generated by the actual system; $J_l$ represents the load inertia; and the current signal i is generated by the actual system according to the speed command and the feedback speed signal ω;

setting a second relation as following in an inverse system:

$$i_0 \times Kt = \frac{\omega_0}{J_0{:}s},$$

wherein, $i_0$ represents a current signal generated by the inverse system; Kt represents the gain constant; $\omega_0$ represents a speed signal generated by the inverse system; $J_0$ represents a unit motor inertia; and the current signal $i_0$ is generated by the inverse system according to the speed signal ω from the actual system and the feedback speed signal $\omega_0$; and said speed signal ω substantially equals to said speed signal $\omega_0$;

deriving a third relation from the first relation and the second relation, as follows:

$$i_0 \times Kt = (Kt:i + T_l) \times \frac{J_l}{J_0} = \frac{1}{\eta} \check{T}_l;$$

when the motor of the AC servo module rotates at a uniform rate, the torque signal $T_l$ is derived to be Kt:i according to the third relation; and when the motor of the AC servo module rotates at a variable rate, the net torque signal $\check{T}_l$ is derived to be $T_l$+Kt:i according to the third relation.

2. The method for estimating load inertia using an inverse model of claim 1, further comprising the steps of:

deriving a fourth relation from the third relation, as follows:

$$\hat{\eta} = \hat{\eta} + \mu \sum_{\omega=\omega 0}^{\omega 1} (\check{T}_l - \hat{\eta} \times Kt \times i_0),$$

wherein, η represents an inertia ratio of the load inertia $J_l$ divided by the unit motor inertia $J_0$; $\hat{\eta}$ represents a net inertia ratio; and the absolute value of the difference between ω1 and ω0, and μ are fixed values respectively;

when the value of the speed signal ω increases from ω0 to ω1, the net inertia ratio $\hat{\eta}$ is accumulated according to the fourth relation, and when the value of the speed signal ω reaches ω1, the net inertia ratio $\hat{\eta}$ is updated according to the fourth relation.

3. The method for estimating load inertia using an inverse model of claim 1, wherein the inverse system is designed into a high bandwidth loop.

4. The method for estimating load inertia using an inverse model of claim 3, wherein the high bandwidth loop is designed to have a bandwidth of about 300 Hz.

5. A system for controlling motor speed using an inverse model, suitable for an AC servo module, comprising:

an actual system, including:

a first synthesizer for receiving an input speed signal and generating an error signal according to the input speed signal and a feedback speed signal;

a first gain controller, connected to the first synthesizer for generating a first gain signal according to the error signal;

a current loop, connected to the first gain controller for converting the first gain signal into a corresponding current signal;

a second gain controller, connected to the current loop for generating a second gain signal according to the current signal corresponding to the first gain signal;

a second synthesizer, connected to the second gain controller for synthesizing a torque signal with the second gain signal into a net torque signal; and a motor mathematical model, connected to the first and second synthesizers for generating a speed signal according to the net torque signal, and feeding the speed signal back into the first synthesizer; and an inverse system, including:

a third synthesizer, connected to the motor mathematical model of the actual system for generating an error signal according to the speed signal generated by the actual system and a feedback speed signal;

a third gain controller, connected to the third synthesizer for generating a third gain signal according to the error signal generated by the third synthesizer;

a current loop, connected to the third gain controller for converting the third gain signal into a corresponding current signal;

a fourth gain controller, connected to the current loop for generating a fourth gain signal according to the current signal corresponding to the third gain signal; and a motor mathematical model, connected to the third synthesizer and the fourth gain controller for generating a speed signal according to the fourth gain signal, and feeding the speed signal back into the third synthesizer;

wherein the net torque signal can be estimated by utilizing an adaptive algorithm according to these current signals generated by the actual system and the inverse system, thereby the load inertia of the AC servo module can be estimated.

6. The system for controlling motor speed using an inverse model of claim 5, wherein the speed signal generated by the actual system substantially equals to the speed signal generated by the inverse system.

7. The system for controlling motor speed using an inverse model of claim 5, wherein the bandwidths of the actual system and the inverse system are much smaller than that of the current loop.

8. The system for controlling motor speed using an inverse model of claim 5, wherein the first and third gain controllers are P/I controllers respectively.

* * * * *